United States Patent
Panier et al.

(10) Patent No.: US 10,526,680 B2
(45) Date of Patent: Jan. 7, 2020

(54) METHOD FOR MANUFACTURING A STRIP HAVING A VARIABLE THICKNESS AND ASSOCIATED STRIP

(71) Applicant: APERAM, Luxembourg (LU)

(72) Inventors: Roland Panier, Nevers (FR); Pierre-Louis Reydet, Urzy (FR); Nicolas Laurain, Briis-sous-Forges (FR)

(73) Assignee: APERAM, Luxembourg (LU)

( * ) Notice: Subject to any disclaimer, the term of this patent is extended or adjusted under 35 U.S.C. 154(b) by 642 days.

(21) Appl. No.: 15/112,417

(22) PCT Filed: Jan. 17, 2014

(86) PCT No.: PCT/IB2014/058350
§ 371 (c)(1),
(2) Date: Oct. 11, 2016

(87) PCT Pub. No.: WO2015/107393
PCT Pub. Date: Jul. 23, 2015

(65) Prior Publication Data
US 2017/0029918 A1    Feb. 2, 2017

(51) Int. Cl.
*F16L 9/17*        (2006.01)
*C22C 38/08*    (2006.01)
(Continued)

(52) U.S. Cl.
CPC ............... *C21D 9/52* (2013.01); *B21B 17/02* (2013.01); *B21C 37/065* (2013.01); *B23K 31/02* (2013.01);
(Continued)

(58) Field of Classification Search
CPC .............................................. F17C 2201/0123
See application file for complete search history.

(56) References Cited

U.S. PATENT DOCUMENTS

| | | |
|---|---|---|
| 3,896,653 A | 7/1975 | Sakai et al. |
| 4,525,431 A | 6/1985 | Duffaut |
| 2012/0279868 A1 | 11/2012 | Gerdenitsch et al. |

FOREIGN PATENT DOCUMENTS

| | | |
|---|---|---|
| CN | 1042101 A | 2/1999 |
| CN | 101755063 A | 6/2010 |

(Continued)

OTHER PUBLICATIONS

Dubar et al., "Major advantages to siting LNG plant offshore", Offshore Magazine, vol. 58 Issue 8, Aug. 1, 1998, accessed via https://www.offshore-mag.com/articles/print/volume-58/issue-8/news/processing/major-advantages-to-siting-lng-plant-offshore.html Dec. 12, 2018. (Year: 1998).*

*Primary Examiner* — Humera N Sheikh
*Assistant Examiner* — Xiaobei Wang
(74) *Attorney, Agent, or Firm* — Knobbe, Martens, Olson & Bear, LLP

(57) ABSTRACT

A method for manufacturing a strip having a variable thickness along its length, comprising the steps:
  an initial strip of constant thickness is provided;
  homogeneous cold rolling of the initial strip along its length in order to obtain an intermediate strip of constant thickness along the rolling direction;
  flexible cold rolling of the intermediate strip along its length in order to obtain a variable thickness strip, having, along its length, first areas with a first thickness (e+s) and second areas with a second thickness (e), less than the first thickness (e+s),
  continuous annealing of the strip.

The plastic deformation ratio generated, after an optional intermediate recrystallization annealing, by the homogeneous cold rolling and the flexible cold rolling steps in the first areas is greater than or equal to 30%.

28 Claims, 2 Drawing Sheets

(51) Int. Cl.
| | |
|---|---|
| C22C 38/04 | (2006.01) |
| C22C 38/02 | (2006.01) |
| C22C 19/03 | (2006.01) |
| C21D 8/02 | (2006.01) |
| C21D 6/00 | (2006.01) |
| B21C 37/06 | (2006.01) |
| C21D 9/52 | (2006.01) |
| C22C 19/00 | (2006.01) |
| C22F 1/10 | (2006.01) |
| B23K 31/02 | (2006.01) |
| C22C 30/00 | (2006.01) |
| C22C 38/10 | (2006.01) |
| C22C 38/14 | (2006.01) |
| C22C 38/40 | (2006.01) |
| C22C 38/50 | (2006.01) |
| C22C 38/52 | (2006.01) |
| B21B 17/02 | (2006.01) |
| C21D 1/38 | (2006.01) |
| C21D 1/42 | (2006.01) |
| C22C 19/05 | (2006.01) |
| B23K 101/06 | (2006.01) |
| B23K 101/18 | (2006.01) |
| B23K 103/04 | (2006.01) |

(52) U.S. Cl.
CPC .............. *B23K 31/027* (2013.01); *C21D 1/38* (2013.01); *C21D 1/42* (2013.01); *C21D 6/001* (2013.01); *C21D 8/0226* (2013.01); *C21D 8/0236* (2013.01); *C21D 8/0268* (2013.01); *C21D 8/0273* (2013.01); *C22C 19/005* (2013.01); *C22C 19/03* (2013.01); *C22C 19/058* (2013.01); *C22C 30/00* (2013.01); *C22C 38/02* (2013.01); *C22C 38/04* (2013.01); *C22C 38/08* (2013.01); *C22C 38/105* (2013.01); *C22C 38/14* (2013.01); *C22C 38/40* (2013.01); *C22C 38/50* (2013.01); *C22C 38/52* (2013.01); *C22F 1/10* (2013.01); *F16L 9/17* (2013.01); *B21B 2261/043* (2013.01); *B23K 2101/06* (2018.08); *B23K 2101/185* (2018.08); *B23K 2103/04* (2018.08); *Y02P 10/253* (2015.11)

(56) References Cited

FOREIGN PATENT DOCUMENTS

| | | |
|---|---|---|
| CN | 101802230 A | 8/2010 |
| CN | 102712961 A | 10/2012 |
| CN | 102888557 A | 1/2013 |
| DE | 3802445 A1 | 8/1989 |
| DE | 19933113 C1 | 9/2000 |
| EP | 0081432 A1 | 6/1983 |
| EP | 1069192 A2 | 1/2017 |
| JP | 48-60059 | 8/1973 |
| JP | 59-189004 A | 10/1984 |
| JP | 60-003904 A | 1/1985 |
| JP | 5-279826 A | 10/1993 |
| JP | 08-073935 A | 3/1996 |
| JP | 09-209089 A | 12/1997 |
| WO | 2008/068352 A2 | 6/2008 |

* cited by examiner

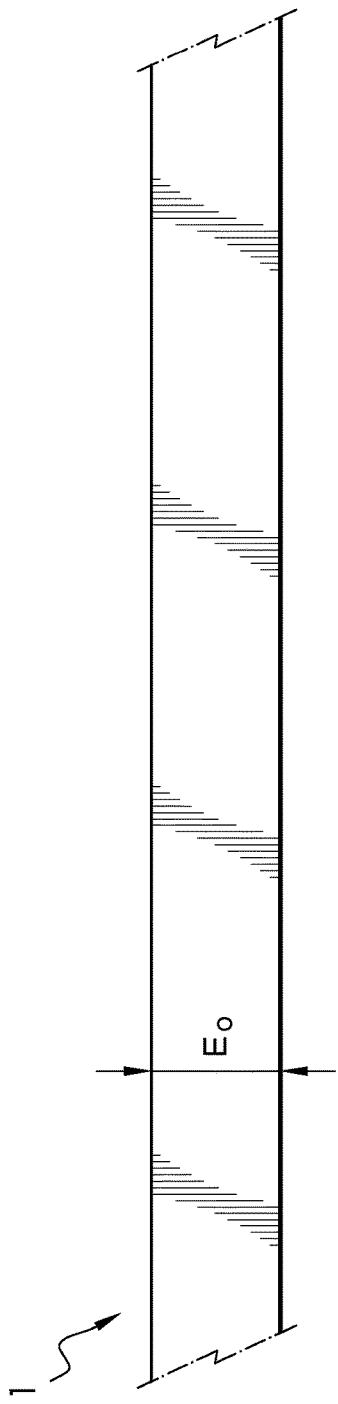
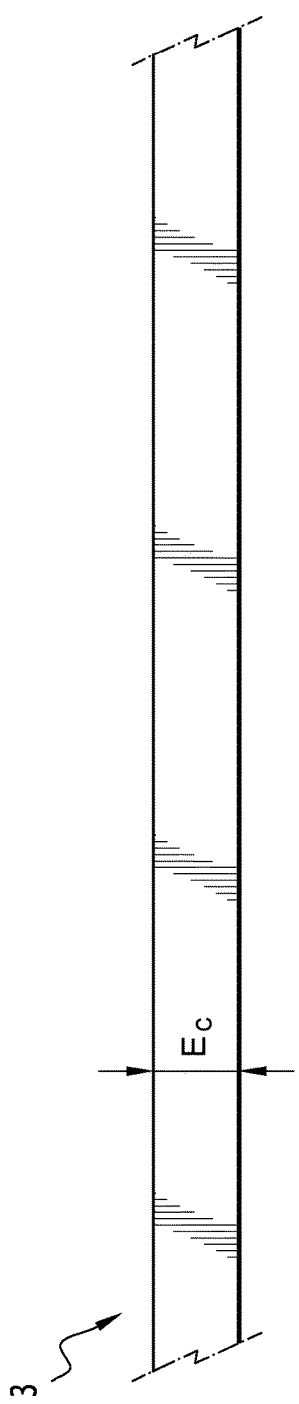
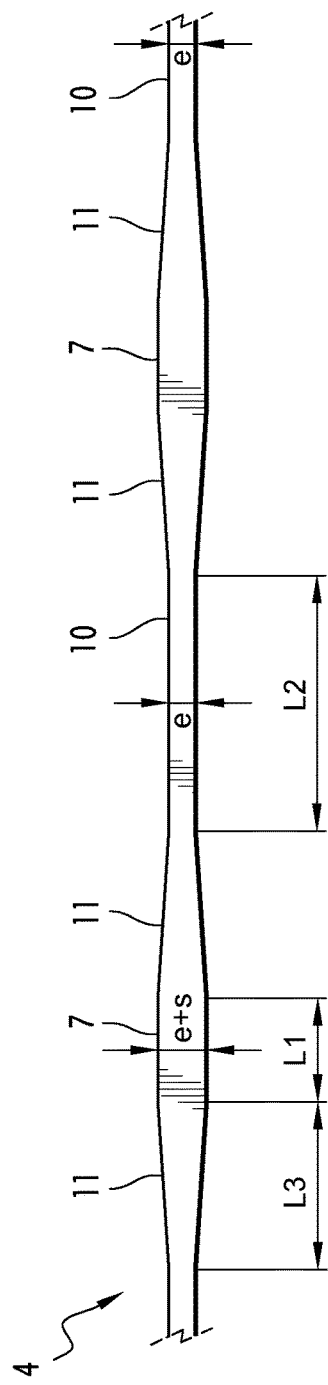

METHOD FOR MANUFACTURING A STRIP HAVING A VARIABLE THICKNESS AND ASSOCIATED STRIP

CROSS-REFERENCE TO RELATED APPLICATIONS

This application is the U.S. National Phase under 35 U.S.C. § 371 of International Application PCT/IB2014/058350, filed Jan. 17, 2014, which are hereby incorporated by reference in its entirety.

FIELD OF THE INVENTION

The present invention relates to a method for manufacturing a strip with variable thickness along its length, made of an iron-based alloy.

BACKGROUND OF THE INVENTION

Cryogenic Invar®, notably Invar® M93, are alloys which have low thermal expansion coefficients, which makes them notably attractive for transporting cryogenic fluids.

In such applications, elements made of cryogenic Invar® of different thicknesses may be assembled, for example by welding.

The thereby obtained assemblies do not give entire satisfaction. Indeed, the welds form weakened areas of the structures formed by the assembled elements. The presence of these weakened areas may result in a reduction of the fatigue strength.

SUMMARY OF THE INVENTION

An object of the invention is to solve this problem by proposing a method for manufacturing a strip mainly based on iron and nickel which gives the possibility of producing structures that are reinforced from a mechanical point of view.

For this purpose, the invention relates to a manufacturing method.

According to particular embodiments, the manufacturing method has one or several of the characteristics, which are taken individually or according to all the technically possible combinations.

The invention also relates to a method for manufacturing a blank.

The invention also relates to a method for manufacturing a cryogenic tube segment.

The invention also relates to a variable thickness strip.
The invention also relates to a blank.
The invention also relates to a cryogenic tube segment.
The invention also relates to an assembly.

BRIEF DESCRIPTION OF THE DRAWINGS

The invention will be better understood upon reading the description which follows, only given as an example, and made with reference to the appended drawings, wherein:

FIG. 1 is a schematic longitudinal sectional view of an initial strip;

FIG. 2 is a schematic longitudinal sectional view of an intermediate strip;

FIG. 3 is a schematic longitudinal sectional view of a variable thickness strip;

DETAILED DESCRIPTION OF THE PREFERRED EMBODIMENTS

Figure 4:
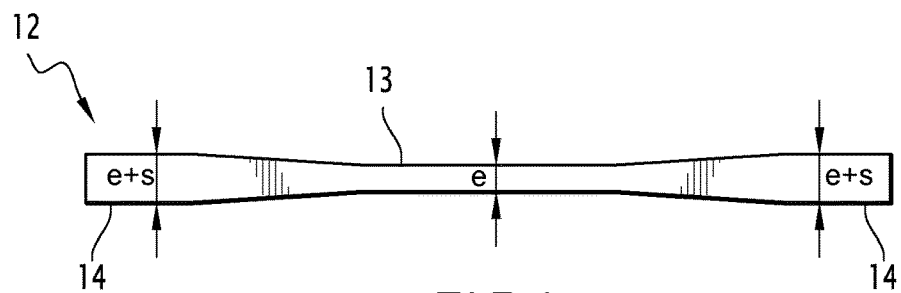
FIG. 4 is a schematic illustration of a blank obtained by the manufacturing method according to the invention.

An exemplary method for manufacturing a strip having a variable thickness along its length made of an alloy mainly based on iron and nickel according to the invention will now be described.

In a first step of this method, an initial strip 1 obtained by hot rolling is provided.

The initial strip 1 is a strip made of an alloy of the cryogenic Invar type. This alloy comprises by weight:
34.5%≤Ni≤53.5%
0.15%≤Mn≤1.5%
0≤Si≤0.35%, preferably 0.1%≤Si≤0.35%
0≤C≤0.07%
optionally:
0≤Co≤20%
0≤Ti≤0.5%
0.01%≤Cr≤0.5%
the remainder being iron and impurities necessarily resulting from the manufacturing.

The silicon notably has the function of allowing deoxidation and of improving the corrosion resistance of the alloy.

An alloy of the cryogenic Inver type is an alloy which has three main properties:

It is stable towards the martensitic transformation until below the liquefaction temperature $T_L$ of a cryogenic fluid. This cryogenic fluid is for example liquid butane, propane, methane, nitrogen or oxygen. The contents of gammagenic elements, nickel (Ni), manganese (Mn) and carbon (C), of the alloy are adjusted so that the onset temperature of the martensitic transformation is strictly less than the liquefaction temperature $T_L$ of the cryogenic fluid.

It has a low average thermal expansion coefficient between room temperature and the liquefaction temperature $T_L$ of the cryogenic fluid.

It does not exhibit any "ductile-fragile" resilience transition.

The alloy used preferably has:
an average thermal expansion coefficient between 20° C. and 100° C. of less than or equal to $10.5 \times 10^{-6}$ $K^{-1}$, in particular less than or equal to $2.5 \times 10^{-6}$ $K^{-1}$;
an average thermal expansion coefficient between −180° C. and 0° C. of less than or equal to $10 \times 10^{-6}$ $K^{-1}$, in particular less than or equal to $2 \times 10^{-6}$ $K^{-1}$; and
a resilience greater than or equal to 100 joule/cm², in particular greater than or equal to 150 joule/cm², at a temperature greater than or equal to −196° C.

Preferably, the alloy used has the following composition, in weight %:
34.5≤Ni≤42.5%
0.15%≤Mn≤0.5%
0≤Si≤0.35%, preferably 0.1%≤Si≤0.35%
0.010%≤C≤0.050%
optionally:
0≤Co≤20%
0≤Ti≤0.5%
0.01%≤Cr≤0.5% the remainder being iron and impurities necessarily resulting from the manufacturing.

In this case, the alloy used preferably has:
an average thermal expansion coefficient between 20° C. and 100° C. of less than or equal to $5.5 \times 10^{-6}$ K$^{-1}$;
an average thermal expansion coefficient between −180° C. and 0° C. of less than or equal to $5 \times 10^{-6}$ K$^{-1}$; and
a resilience greater than or equal to 100 joule/cm$^2$, in particular greater than or equal to 150 joule/cm$^2$, at a temperature greater than or equal to −196° C.

Still more particularly,
$35\% \leq Ni \leq 36.5\%$
$0.2\% \leq Mn \leq 0.4\%$
$0.02 \leq C \leq 0.04\%$
$0.15 \leq Si \leq 0.25\%$
optionally
$0 \leq Co \leq 20\%$
$0 \leq Ti \leq 0.5\%$
$0.01\% \leq Cr \leq 0.5\%$
the remainder being iron and impurities necessarily resulting from the manufacturing.

In this case, the alloy preferably has:
an average thermal expansion coefficient between 20° C. and 100° C. of less than or equal to $1.5 \times 10^{-6}$ K$^{-1}$;
an average thermal expansion coefficient between −180° C. and 0° C. of less than or equal to $2 \times 10^{-6}$ K$^{-1}$;
a resilience greater than or equal to 200 joule/cm$^2$ at a temperature greater than or equal to −196° C.

Such an alloy is an alloy of the cryogenic Invar® type. The trade name of this alloy is Invar®-M93.

Conventionally, the alloys used are elaborated in an electric arc furnace or an induction vacuum furnace.

After operations of refining in a ladle, which allow adjusting the contents of residual alloy elements, the alloys are cast as semi-finished products, which are subjected to hot processing, in particular by hot rolling, in order to obtain strips.

These semi-finished products are for example ingots. Alternatively, they are formed by slabs continuously cast by means of an installation for continuous casting of slabs.

The thereby obtained strip is stripped and polished in a continuous process in order to limit its defects: calamine, oxidized penetration, flakes and thickness inhomogeneities in the direction of the length and of the width of the strip.

The polishing is notably achieved by means of grinders or abrasive papers. One function of the polishing is to remove the stripping residues.

At the end of this polishing step, the initial strip 1 provided in the first step of the method according to the invention is obtained.

Optionally, before the homogenous cold rolling step, annealing is carried out on the strip for homogenization of the microstructure. This microstructure homogenization annealing is notably a continuous annealing in a heat treatment oven, called microstructure homogenization annealing oven in the subsequent description, with a dwelling time in the microstructure homogenization annealing oven comprised between 2 minutes and 25 minutes and a temperature of the strip during the microstructure homogenization annealing comprised between 850° C. and 1200° C.

The initial strip 1 has a constant thickness $E_0$ comprised between 1.9 mm and 18 mm (see FIG. 1).

The initial strip 1 is then rolled during a homogenous cold rolling step. The homogenous rolling is carried out along the length of the initial strip 1.

By homogenous rolling, is meant a rolling which transforms a strip having a constant thickness into a thinner strip also having a constant thickness.

More particularly, the homogenous rolling step comprises one or several passes performed in a mill wherein the strip passes into a rolling gap delimited between working rolls. The thickness of this rolling gap remains constant during each pass of the homogenous rolling step.

This homogenous rolling step results in an intermediate strip 3 having a constant thickness $E_c$ along the rolling direction, i.e. along the length of the intermediate strip 3 (see FIG. 2).

Optionally, the homogenous rolling step comprises at least one intermediate recrystallization annealing.

When it is present, the intermediate recrystallization annealing is carried out between two successive homogenous rolling passes. Alternatively or optionally, it is carried out before the flexible rolling step at the end of the homogenous rolling step, i.e. after all the rolling passes carried out during the homogenous rolling step.

For example, the intermediate recrystallization annealing is a continuous annealing carried out in an intermediate annealing oven with a temperature of the strip during the intermediate annealing comprised between 850° C. and 1200° C. and a dwelling time in the intermediate annealing oven comprised between 30 seconds and 5 minutes.

The intermediate recrystallization annealing, or when several intermediate recrystallization annealings are carried out, the last intermediate recrystallization annealing of the homogenous rolling step, is carried out when the strip has a thickness $E_i$ comprised between the thickness $E_0$ of the initial strip 1 and the thickness $E_c$ of the intermediate strip 3.

When the intermediate recrystallization annealing is carried out at the end of the homogenous rolling step, the thickness $E_i$ of the strip during the intermediate recrystallization annealing is equal to the thickness $E_c$ of the intermediate strip 3 at the beginning of the flexible rolling step.

Advantageously, in the embodiment in which at least one intermediate recrystallization annealing is carried out, a single intermediate recrystallization annealing is carried out. In particular, this single intermediate recrystallization annealing is carried out between two successive homogeneous rolling passes when the strip has a thickness $E_i$ strictly greater than the thickness $E_c$ of the intermediate strip 3.

Preferably, the homogenous rolling step does not comprise any intermediate annealing.

The intermediate strip 3 having a thickness $E_c$ obtained at the end of the homogenous rolling step is then subjected to a flexible cold rolling step.

The flexible rolling is carried out along a rolling direction extending along the length of the intermediate strip 3.

Flexible rolling allows obtaining a strip having a variable thickness along its length.

For this, the thickness of the rolling gap of the mill used is continuously varied. This variation depends on the desired thickness of the area of the strip being rolled so as to obtain a strip having a variable thickness along its length.

More particularly, and as illustrated in FIG. 3, at the end of the flexible rolling step a variable thickness strip 4 comprising first areas 7 having a first thickness e+s and second areas 10 having a second thickness e, smaller than the first thickness e+s. The first thickness e+s and the second thickness e each correspond to a given rolling gap thickness.

The first areas 7 and the second areas 10 each have a substantially constant thickness, e+s and e, respectively.

They are connected together through connecting areas 11 having a non-constant thickness along the length of the variable thickness strip 4. The thickness of the connecting areas 11 varies between e and e+s. According to an example, it varies linearly between e and e+s.

The homogenous rolling step and the flexible rolling step generate in the first areas 7, i.e. in the thickest areas of the strip 4, a plastic deformation ratio $\tau_1$, after an optional intermediate recrystallization annealing, which is greater than or equal to 30%, more particularly comprised between 30% and 98%, still more particularly comprised between 30% and 80%. In the aforementioned ranges, the plastic deformation ratio $\tau_1$ is advantageously greater than or equal to 35%, more particularly greater than or equal to 40%, and still more particularly greater than or equal to 50%.

The plastic deformation ratio $\tau_1$ generated in the first areas 7 is defined as follows:

If no intermediate recrystallization annealing is carried out during the homogenous rolling step, the plastic deformation ratio $\tau_1$ is the total reduction ratio generated in the first areas 7 of the strip 4 by the homogenous rolling step and the flexible rolling step, i.e. resulting from the reduction in thickness from the initial thickness $E_0$ to the thickness e+s.

In this case, the plastic deformation ratio $\tau_1$, in percentage, is given by the following formula:

$$\tau_1 = \frac{E_0 - (e+s)}{E_0} \times 100. \quad (1)$$

Thus, in the case when no intermediate recrystallization annealing is carried out, the plastic deformation ratio $\tau_1$ is equal to the total reduction ratio generated in the first areas 7 by the homogenous rolling step and the flexible rolling step.

If at least one intermediate recrystallization annealing is carried out during the homogenous rolling step, the plastic deformation ratio $\tau_1$ is the reduction ratio generated in the first areas 7 by the reduction in thickness of the strip from the thickness $E_i$ which it has during the last intermediate recrystallization annealing carried out during the homogenous rolling step to thickness e+s.

In this case, the plastic deformation ratio $\tau_1$, in percentage, is given by the following formula:

$$\tau_1 = \frac{E_i - (e+s)}{E_i} \times 100. \quad (2)$$

Thus, in the case when one or several intermediate annealings are carried out during the homogenous rolling step, the plastic deformation ratio $\tau_1$ is strictly smaller than the total reduction ratio generated in the first areas 7 by the homogenous rolling step and the flexible cold rolling step.

The plastic deformation ratio $\tau_2$ after an optional intermediate recrystallization annealing, generated in the second areas 10, is strictly greater than the plastic deformation ratio $\tau_1$ in the first areas 7. It is calculated in a similar way, by replacing e+s with e in the formulae (1) and (2) above.

The difference $\Delta\tau$ of the plastic deformation ratio between the second areas 10 and the first areas 7 is given by the relationship $\Delta\tau = \tau_2 - \tau_1$.

This difference $\Delta\tau$ is advantageously smaller than or equal to 13% if the thickness $E_0$ is strictly greater than 2 mm. It is advantageously smaller than or equal to 10% if the thickness $E_0$ is less than or equal to 2 mm.

More particularly, the difference $\Delta\tau$ is less than or equal to 10% of $E_0$ is strictly greater than 2 mm, and the difference $\Delta\tau$ is less than or equal to 8% if $E_0$ is less than or equal to 2 mm.

Advantageously, the thickness $E_c$ of the intermediate strip 3 before the flexible rolling step is in particular equal to the thickness e of the second areas 10 multiplied by a reduction coefficient k comprised between 1.05 and 1.5. Advantageously, k is equal to about 1.3.

Advantageously, the thicknesses e+s and e of the first and second areas 7, 10 observe the equation:

$$e+s=(n+1).e$$

wherein n is a constant coefficient comprised between 0.05 and 0.5.

In other words, the first thickness e+s is equal to the second thickness e multiplied by a multiplication coefficient comprised between 1.05 and 1.5.

This equation can be rewritten in the following way: s=n.e, i.e. the over-thickness s of the first areas 7 relatively to the second areas 10 is equal to the coefficient n multiplied by the thickness e of the second areas 10.

The thickness e of the second areas 10 is comprised between 0.05 mm and 10 mm, more particularly between 0.15 mm and 10 mm, still more particularly between 0.25 mm and 8.5 mm. When sheets are made, the thickness e is less than or equal to 2 mm, advantageously comprised between 0.25 mm and 2 mm. When plates are made, the thickness e is strictly greater than 2 mm, in particular comprised between 2.1 mm and 10 mm, more particularly comprised between 2.1 mm and 8.5 mm.

Next the variable thickness strip 4 resulting from the flexible rolling step is subjected to a final recrystallization annealing.

The final recrystallization annealing is a continuous annealing carried out in a final annealing oven. The temperature of the final annealing oven is constant during the final recrystallization annealing. The temperature of the strip 4 during the final recrystallization annealing is comprised between 850° C. and 1200° C.

The dwelling time in the final annealing oven is comprised between 20 seconds and 5 minutes, more particularly between 30 seconds and 3 minutes.

The running speed of the strip 4 in the final annealing oven is constant. For example it is comprised between 2 m/min and 20 m/min for a final annealing oven with a heating length equal to 10 m.

Advantageously, the temperature of the strip 4 during the final annealing is 1025° C. In this case, the dwelling time in the final annealing oven is for example comprised between 30 seconds and 60 seconds for a variable thickness strip 4 having second areas 10 with a thickness e of less than or equal to 2 mm. The dwelling time in the final annealing oven is for example comprised between 3 minutes and 5 minutes for a variable thickness strip 4 having second areas 10 with a thickness e strictly greater than 2 mm.

The dwelling time in the final annealing oven, as well as the final annealing temperature are selected so as to obtain after the final recrystallization annealing a strip 4 having quasi-homogenous mechanical properties and grain sizes between the first areas 7 and the second areas 10. Subsequent description specifies the meaning of "quasi-homogenous".

Preferably, the final annealing is carried out in a reducing atmosphere, i.e. for example in pure hydrogen or in a H₂—N₂ atmosphere. The frost temperature is preferably less than −40° C. In the case of a H₂—N₂ atmosphere, the content of N₂ may be comprised between 0% and 95%. The atmosphere H₂—N₂ for example comprises approximately 70% of H₂ and 30% of N₂.

According to an embodiment, the variable thickness strip 4 continuously passes from the flexible rolling mill to the final annealing oven, i.e. without any intermediate coiling of the variable thickness strip 4.

Alternatively, at the end of the flexible rolling step, the variable thickness strip 4 is coiled so as to transport it to the final annealing oven, and then it is uncoiled and subjected to the final recrystallization annealing.

According to this alternative, the coiled strip 4 for example has a length comprised between 100 m and 2500 m, notably if the thickness e of the second areas 10 of the strip 4 is approximately 0.7 mm.

At the end of the final recrystallization annealing, a strip 4 having a variable thickness along its length is obtained having the following characteristics.

It comprises first areas 7 having a thickness of e+s and second areas of thickness e, optionally connected together through connecting areas 11 with a thickness varying between e and e+s.

Preferably, the absolute value difference between the average size of the grains of the first areas 7 and the average size of the grains of the second areas 10 is less than or equal to 0.5 numbers according to the ASTM E112-10 standard. The average grain size in ASTM numbers is determined by using the method of comparison with typical images as described in the ASTM E112-10 standard. According to this method, in order to determine the average grain size of a sample, an image of the structure of the grains on the screen obtained by means of an optical microscope at a given magnification of the sample having been subjected to contrast etching is compared with typical images illustrating twinned grains of different sizes having been subject to contrast etching (corresponding to plate III of the standard). The average grain size number of the sample is determined as being the number corresponding to the magnification used borne on the typical image which looks the most like the image seen on the screen of the microscope.

If the image seen on the screen of the microscope is intermediate between two successive typical images of grain sizes, the average grain size number of the image seen in the microscope is determined as being the arithmetic mean between the numbers corresponding to the magnification used borne on each of the two typical images.

More particularly, the average grain size number $G1_{ASTM}$ of the first areas 7 is at most 0.5 less than the average size number $G2_{ASTM}$ of the second areas 10.

The variable thickness strip 4 may have quasi-homogenous mechanical properties.

In particular:
the absolute value difference between the yield strength at 0.2% of the first areas 7 noted as Rp1 and the yield strength at 0.2% of the second areas 10 noted as Rp2 is less than or equal to 6 MPa, and
the absolute value difference between the ultimate tensile strength of the first areas 7 noted as Rm1 and the ultimate tensile strength of the second areas 10 noted as Rm2 is less than or equal to 6 MPa.

By yield strength at 0.2%, is conventionally meant the stress value at a plastic deformation of 0.2%.

Conventionally, the ultimate tensile strength corresponds to the maximum stress before striction of the test sample.

In the illustrated example, the variable thickness strip 4 has a pattern periodically repeated over the whole length of the strip 4. This pattern successively comprises one half of a first area 7 with a length $$\frac{L_1}{2},$$

a connecting area 11 of length L3, a second area 10 of length L2, a connecting area 11 of length L3 and one half of a first area 7 with a length of $$\frac{L_1}{2}.$$

Advantageously, the length L2 of the second area 10 is substantially greater than the length L1 of the first area 7. As an example, the length L2 is comprised between 20 and 100 times the length L1.

Each sequence formed by a first area 7 surrounded by two connecting areas 11 forms an over-thickness area of the variable thickness strip 4, i.e. an area with a thickness greater than e. Thus, the variable thickness strip 4 comprises second areas 10 of length L2 with a thickness e, separated between them by over-thickness areas.

After the final recrystallization annealing, the variable thickness strip 4 is cut out in the over-thickness areas, preferably in the middle of the over-thickness areas.

Blanks 12 illustrated in FIG. 4 are thereby obtained, comprising a second area of length L2 surrounded at each of its longitudinal ends by a connecting area 11 of length L3 and by a half of a first area 7 of length $$\frac{L1}{2}.$$

At the end of the cutting step, the blanks 12 are leveled according to a known leveling method.

The blanks 12 are then wound into unit coils.

According to an alternative of the manufacturing method described above, the leveling of the variable thickness strip 4 is carried out after the final recrystallization annealing and before the cutting out of the blanks 12.

According to this alternative, the leveled variable thickness strip 4 is cut out in the over-thickness areas in order to form the blanks 12. Preferably, the strip 4 is cut out in the middle of the over-thickness areas.

The cutting out is for example performed on the leveler used for leveling the strip 4. Alternatively, the leveled strip 4 is wound into a coil, and then cut out on a machine different from the leveler.

The blanks 12 are then wound as unit coils.

By means of the manufacturing method described above, blanks 12 formed in one piece comprising a central area 13 of thickness e, surrounded by reinforced ends 14, i.e. with a thickness greater than the thickness e of the central area 13, are obtained. The ends 14 correspond to over-thickness areas of the variable thickness strip 4 and the central area 13 corresponds to a second area 10 of the variable thickness strip 4 from which the blank 12 has been cut out.

These blanks 12, which have a variable thickness along their length while being formed with one part, do not have the weaknesses of the welded assemblies of the state of the art. Further, their reinforced ends 14 allow assembling them by welding with other parts while minimizing the mechanical weaknesses due to this assembling by welding.

According to alternatives, the blanks 12 may for example be obtained by cutting out the strip 4 at other locations than in two successive over-thickness areas. For example, they may be obtained by alternately cutting them in an over-thickness area and in a second area 10. In this case, blanks 12 are obtained having a single reinforced end 14 with a thickness greater than e.

They may also be obtained by cutting out in two successive second areas 10.

Figure 5:
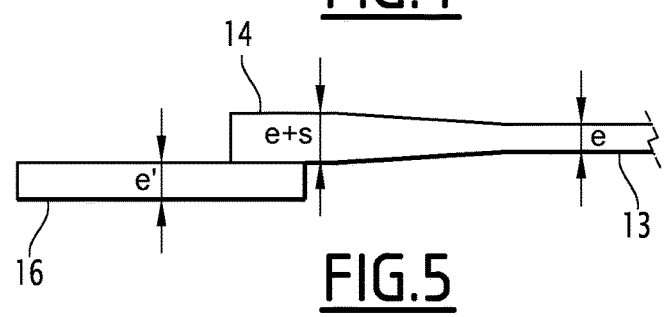
FIG. 5 is a schematic longitudinal sectional illustration of a first assembly of a blank with a second part.

As an example, and as illustrated in FIG. 5, a blank 12 according to the invention may be assembled with a second part 16 by welding one of the reinforced ends 14 of the blank 12 to an edge of the second part 16. The thickness of the second part 16 is preferably greater than the thickness of the central area 13 of the blank 12. The weld performed is more particularly a lap weld.

The part 16 may be a blank 12 as described above.

Figure 6:
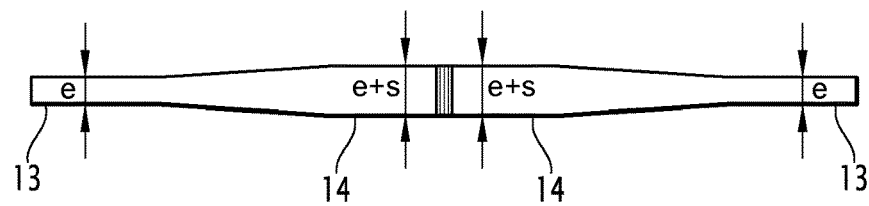
FIG. 6 is a schematic longitudinal sectional illustration of two blanks assembled end to end.

Thus, in FIG. 6, two blanks 12 assembled end to end by welding are illustrated. These two blanks 12 are welded together through their reinforced ends 14.

In the examples illustrated in FIGS. 5 and 6:
the length of the central area 13 is for example comprised between 40 m and 60 m; and
the length of each reinforced end 14 is for example comprised between 0.5 m and 2 m.

The second thickness e is notably about equal to 0.7 mm.
The first thickness e+s is about equal to 0.9 mm.

Alternatively, a non-planar part is formed from the blank 12.

Figure 7:
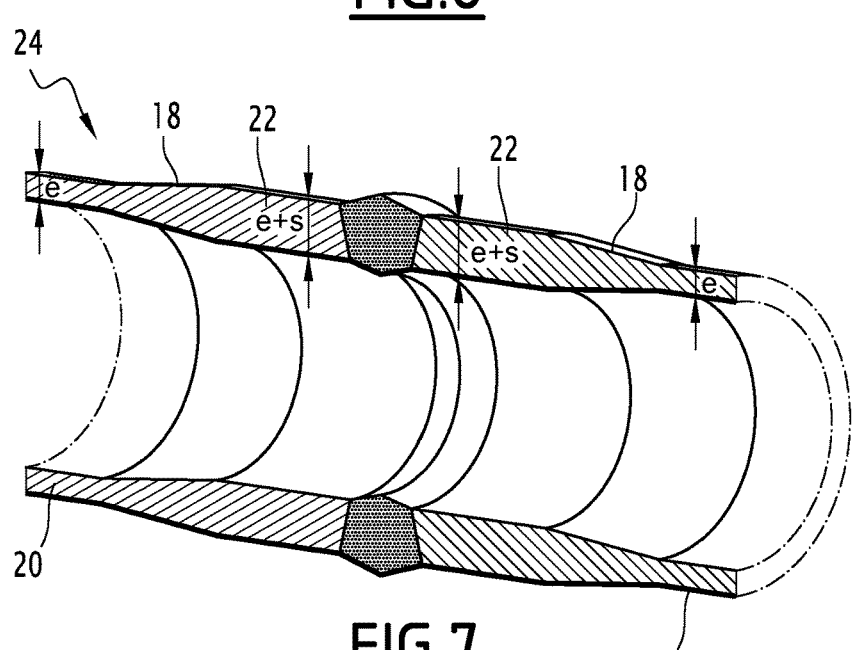
FIG. 7 is a schematic sectional illustration of a cryogenic tube.

Thus, in the example illustrated in FIG. 7, a tube segment 18 is formed from the blank 12.

The edges of the blank 12 extending along the length of the blank 12 are called longitudinal edges.

In order to manufacture the tube segment 18, the blank 12 is rolled up along its width, i.e. around a longitudinal axis L so as to form a rolled up blank 12. The longitudinal edges of the rolled up blank 12 are then welded together so as to form the tube segment 18. This tube segment 18 has a cylindrical central area 20 of thickness e and cylindrical reinforced ends 22 with a thickness greater than the thickness e, and in particular equal to e+s.

A tube 24 is then made by welding at least two tube segments 18 together through their reinforced ends 22. The weld is an orbital weld, in particular a weld of the end-to-end type.

The thickness e+s of the reinforced ends 22 is defined depending on the traction forces which the tube 24 has to undergo during its mounting and during its use.

Such a tube 24 is for example a cryogenic tube suitable for conveying liquefied natural gas and intended to form for example the main tube coated with a material protecting it against the corrosion of a cryogenic under-water conduit for conveying liquefied natural gas or the inner tube of such a conduit.

In this case, for example:
the thickness e is equal to about 8.2 mm;
the thickness e+s is equal to about 9.43 mm.

The length L2 of the central area 20 of a tube segment 18 is equal to about 8 m.

The manufacturing method according to the invention is particularly advantageous. Indeed, it allows obtaining a strip made of an alloy mainly based on iron and nickel having the chemical composition defined above having areas with different thicknesses but quasi-homogeneous mechanical properties. These properties are obtained by the use of a plastic deformation ratio after an optional intermediate recrystallization annealing generated by the homogenous rolling and flexible rolling steps in the thickest areas greater than or equal to 30%.

The following experimental examples illustrate the significance of the range of plastic deformation ratio claimed for this type of alloy.

In a first series of experiments, variable thickness sheets were made, i.e. variable thickness strips 4 having a thickness e of the second areas 10 is less than or equal to 2 mm.

Table 1 hereafter illustrates tests for manufacturing sheets having variable thickness without any intermediate recrystallization annealing.

Table 2 hereafter contains characteristics of the sheets obtained by the tests of Table 1.

Table 3 hereafter illustrates tests for manufacturing sheets with variable thickness with an intermediate recrystallization annealing at thickness $E_i$.

Table 4 hereafter contains characteristics of the sheets obtained by the tests of Table 3.

In a second series of experiments, variable thickness plates were manufactured, i.e. variable thickness strips 4 having a thickness e of the second areas 10 is strictly greater than 2 mm.

Table 5 illustrates tests for manufacturing variable thickness plates with or without any intermediate annealing.

Table 6 hereafter contains characteristics of the plates obtained by the tests of Table 5.

In all the tables, the tests according to the invention are underlined.

It is seen that when the plastic deformation ratio $\tau_1$ after an optional intermediate recrystallization annealing is greater than or equal to 30% (tests 1 to 7 of Table 1, 1 to 3 of Table 3 and 1 to 9 of Table 5), the obtained variable thickness strip 4 has an average grain size difference between the average size of the grains of the first areas 7 (thickness e+s) and the size of the grains of the second areas 10 (thickness e) of less than or equal to 0.5 ASTM numbers in absolute value. This small average grain size difference between the first areas 7 and the second areas 10 results in quasi-homogenous mechanical properties, i.e. a difference in yield strength at 0.2%, DeltaRp between the first areas 7 and the second areas 10 of less than or equal to 6 MPa in absolute value, and a difference between the ultimate tensile strength DeltaRm of the first areas 7 and of the second areas 10 of less than or equal to 6 MPa in absolute value.

It is thus possible to obtain a variable thickness strip 4, having quasi-homogenous mechanical properties and grain sizes at the end of a very simple recrystallization annealing, since it is carried out at a constant temperature and constant running speed.

TABLE 1

| Test | Wavelength (m) | $E_0$ (mm) | k | $E_c$ (mm) | e (mm) | n = s/e | e + s (mm) | L1 (m) | L2 (m) | L3 (m) | τ1 (%) | τ2 (%) | τ2 − τ1 (%) | Final annealing T° C.; duration |
|---|---|---|---|---|---|---|---|---|---|---|---|---|---|---|
| <u>1</u> | <u>50</u> | <u>4.2</u> | <u>1.3</u> | <u>2.0</u> | <u>1.5</u> | <u>0.25</u> | <u>1.88</u> | <u>1.50</u> | <u>1.90</u> | <u>44.7</u> | <u>55</u> | <u>64</u> | <u>9</u> | <u>1025° C.; 60 s</u> |
| <u>2</u> | <u>50</u> | <u>4.2</u> | <u>1.15</u> | <u>1.7</u> | <u>1.5</u> | <u>0.15</u> | <u>1.73</u> | <u>1.50</u> | <u>1.90</u> | <u>44.7</u> | <u>59</u> | <u>64</u> | <u>5</u> | <u>1025° C.; 60 s</u> |

TABLE 1-continued

| Test | Wavelength (m) | $E_0$ (mm) | k | $E_c$ (mm) | e (mm) | n = s/e | e + s (mm) | L1 (m) | L2 (m) | L3 (m) | τ1 (%) | τ2 (%) | τ2 − τ1 (%) | Final annealing T° C.; duration |
|---|---|---|---|---|---|---|---|---|---|---|---|---|---|---|
| 3 | 50 | 3.2 | 1.15 | 1.2 | 1.0 | 0.15 | 1.15 | 1.00 | 1.50 | 46.0 | 64 | 69 | 5 | 1025° C.; 60 s |
| 4 | 50 | 2.6 | 1.3 | 0.9 | 0.7 | 0.25 | 0.88 | 1.00 | 1.50 | 46.0 | 66 | 73 | 7 | 1025° C.; 40 s |
| 5 | 50 | 2.6 | 1.15 | 0.8 | 0.7 | 0.15 | 0.81 | 1.00 | 1.50 | 46.0 | 69 | 73 | 4 | 1025° C.; 40 s |
| 6 | 60 | 2.6 | 1.3 | 0.9 | 0.7 | 0.15 | 0.81 | 1.00 | 1.50 | 56.0 | 69 | 73 | 4 | 1025° C.; 40 s |
| 7 | 50 | 2.1 | 1.3 | 0.7 | 0.5 | 0.15 | 0.58 | 1.20 | 1.50 | 45.8 | 73 | 76 | 4 | 1025° C.; 30 s |
| 8 | 50 | 2.3 | 1.3 | 2.3 | 1.8 | 0.25 | 2.25 | 1.20 | 1.50 | 45.8 | 2 | 22 | 20 | 1025° C.; 60 s |

TABLE 2

| | Properties at thickness e + s | | | Properties at thickness e | | | | | |
|---|---|---|---|---|---|---|---|---|---|
| Test | $G1_{ASTM}$ | Rp (MPa) | Rm (MPa) | $G2_{ASTM}$ | Rp (MPa) | Rm (MPa) | Delta Rp (MPa) | Delta Rm (MPa) | $DeltaG_{ASTM}$ |
| 1 | 8 | 288 | 487 | 8.5 | 292 | 491 | −4 | −4 | 0.5 |
| 2 | 8.5 | 293 | 492 | 9 | 296 | 495 | −3 | −3 | 0.5 |
| 3 | 8.5 | 293 | 492 | 9 | 295 | 495 | −2 | −3 | 0.5 |
| 4 | 8.5 | 293 | 490 | 9 | 296 | 496 | −3 | −6 | 0.5 |
| 5 | 9 | 297 | 496 | 9 | 296 | 496 | 1 | 0 | 0 |
| 6 | 9 | 297 | 495 | 9 | 296 | 496 | 1 | −1 | 0 |
| 7 | 9.5 | 300 | 501 | 9.5 | 300 | 501 | 0 | 0 | 0 |
| 8 | 7.5 | 284 | 482 | 8.5 | 292 | 490 | −8 | −8 | 1 |

TABLE 3

| Test | Wavelength (m) | $E_0$ (mm) | k | $E_i$ (mm) | Annealing at $E_i$ T° C.; duree | $E_c$ (mm) | e (mm) | n = s/e | e + s (mm) | L1 (m) | L2 (m) | L3 (m) | τ1 (%) | τ2 (%) | τ2 − τ1 (%) | Final annealing T° C.; duration |
|---|---|---|---|---|---|---|---|---|---|---|---|---|---|---|---|---|
| 1 | 50 | 2.6 | 1.3 | 1.5 | 1025°C.;50s | 0.8 | 0.6 | 0.25 | 0.75 | 1.20 | 1.50 | 45.8 | 50 | 60 | 10 | 1025° C.; 40 s |
| 2 | 50 | 2.6 | 1.3 | 1.5 | 1025°C.;50s | 0.8 | 0.6 | 0.15 | 0.69 | 1.20 | 1.50 | 45.8 | 54 | 60 | 6 | 1025° C.; 40 s |
| 3 | 60 | 2.6 | 1.3 | 1.5 | 1025°C.;50s | 0.7 | 0.5 | 0.25 | 0.63 | 1.20 | 1.50 | 55.8 | 62 | 67 | 5 | 1025° C.; 30 s |
| 4 | 50 | 4.2 | 1.30 | 2.00 | 1025° C.; 80 s | 1.95 | 1.5 | 0.25 | 1.88 | 1.50 | 1.90 | 44.7 | 6 | 25 | 19 | 1025° C.; 60 s |
| 5 | 50 | 4.2 | 1.15 | 2.00 | 1025° C.; 80 s | 1.73 | 1.5 | 0.15 | 1.73 | 1.50 | 1.90 | 44.7 | 14 | 25 | 11 | 1025° C.; 60 s |
| 6 | 50 | 3.2 | 1.30 | 1.30 | 1025° C.; 50 s | 1.30 | 1.0 | 0.25 | 1.25 | 1.50 | 1.90 | 44.7 | 4 | 23 | 19 | 1025° C.; 60 s |
| 7 | 50 | 3.2 | 1.15 | 1.50 | 1025° C.; 60 s | 1.15 | 1.0 | 0.15 | 1.15 | 1.00 | 1.50 | 46.0 | 23 | 33 | 10 | 1025° C.; 60 s |
| 8 | 60 | 2.6 | 1.15 | 1.00 | 1000° C.; 40 s | 0.81 | 0.7 | 0.15 | 0.81 | 1.00 | 1.50 | 56.0 | 20 | 30 | 11 | 1025° C.; 40 s |

TABLE 4

| | Properties at thickness e + s | | | Properties at thickness e | | | | | |
|---|---|---|---|---|---|---|---|---|---|
| Test | $G1_{ASTM}$ | Rp (MPa) | Rm (MPa) | $G2_{ASTM}$ | Rp (MPa) | Rm (MPa) | Delta Rp (MPa) | Delta Rm (MPa) | $DeltaG_{ASTM}$ |
| 1 | 8.5 | 292 | 491 | 8.5 | 293 | 491 | −1 | 0 | 0 |
| 2 | 8.5 | 293 | 492 | 8.5 | 291 | 492 | 2 | 0 | 0 |
| 3 | 8.5 | 293 | 490 | 9 | 296 | 496 | −3 | −6 | 0.5 |
| 4 | 7 | 281 | 478 | 8 | 290 | 487 | −9 | −9 | 1 |
| 5 | 7 | 281 | 477 | 8 | 288 | 487 | −7 | −10 | 1 |
| 6 | 6.5 | 277 | 473 | 8 | 288 | 487 | −11 | −14 | 1.5 |
| 7 | 7 | 282 | 477 | 8 | 289 | 487 | −7 | −10 | 1 |
| 8 | 6.5 | 277 | 474 | 7.5 | 285 | 482 | −8 | −8 | 1 |
| 9 | 7 | 282 | 479 | 8 | 289 | 487 | −7 | −8 | 1 |

TABLE 5

| Test | Wavelength (m) | $E_0$ (mm) | k | $E_i$ (mm) | Annealing at $E_i$ T° C.; duration | $E_c$ (mm) | e (mm) | n = s/e | e + s (mm) | L1 (m) | L2 (m) | L3 (m) | τ1 (%) | τ2 (%) | τ2 − τ1 (%) | Final annealing T° C.; duration |
|---|---|---|---|---|---|---|---|---|---|---|---|---|---|---|---|---|
| 1 | 12 | 16 | 1.30 | | Néant | 10.7 | 8.2 | 0.25 | 10.25 | 1.00 | 1.50 | 8.0 | 36 | 49 | 13 | 1025° C.; 5 min |
| 2 | 6 | 16 | 1.15 | | Néant | 9.4 | 8.2 | 0.15 | 9.43 | 0.50 | 0.75 | 4.0 | 41 | 49 | 8 | 1025° C.; 5 min |
| 3 | 12 | 8.2 | 1.30 | | Néant | 5.5 | 4.2 | 0.25 | 5.25 | 0.50 | 0.75 | 10.0 | 36 | 49 | 13 | 1025° C.; 3 min |
| 4 | 12 | 8.2 | 1.15 | | Néant | 4.8 | 4.2 | 0.15 | 4.83 | 1.50 | 2.25 | 6.0 | 41 | 49 | 8 | 1025° C.; 3 min |
| 5 | 6 | 8.2 | 1.30 | | Néant | 4.2 | 3.2 | 0.25 | 4.00 | 0.80 | 1.20 | 2.8 | 51 | 61 | 10 | 1025° C.; 3 min |

TABLE 5-continued

| Test | Wave-length (m) | $E_0$ (mm) | k | $E_i$ (mm) | Annealing at $E_i$ T° C.; duration | $E_c$ (mm) | e (mm) | n = s/e | e + s (mm) | L1 (m) | L2 (m) | L3 (m) | τ1 (%) | τ2 (%) | τ2 − τ1 (%) | Final annealing T° C.; duration |
|---|---|---|---|---|---|---|---|---|---|---|---|---|---|---|---|---|
| 6 | 9 | 8.2 | 1.15 | | Néant | 3.7 | 3.2 | 0.15 | 3.68 | 1.00 | 1.50 | 5.0 | 55 | 61 | 6 | 1025° C.; 3 min |
| 7 | 12 | 16 | 1.30 | 8.2 | 1050° C.;5min | 4.2 | 3.2 | 0.25 | 4.00 | 1.00 | 1.50 | 8.0 | 51 | 61 | 10 | 1025° C.; 3 min |
| 8 | 12 | 16 | 1.15 | 8.2 | 1050° C.;5min | 4.8 | 4.2 | 0.15 | 4.83 | 0.50 | 0.75 | 10.0 | 41 | 49 | 8 | 1025° C.; 3 min |
| 9 | 6 | 16 | 1.15 | 8.2 | 1050° C.;5min | 3.7 | 3.2 | 0.15 | 3.68 | 0.50 | 0.75 | 4.0 | 55 | 61 | 6 | 1025° C.; 3 min |

TABLE 6

| | Properties at thickness e + s | | | Properties at thickness e | | | | | |
|---|---|---|---|---|---|---|---|---|---|
| Test | $G1_{ASTM}$ | Rp (MPa) | Rm (MPa) | $G2_{ASTM}$ | Rp (MPa) | Rm (MPa) | Delta Rp (MPa) | Delta Rm (MPa) | Delta$G_{ASTM}$ |
| 1 | 7 | 280 | 479 | 7.5 | 285 | 483 | −5 | −4 | 0.5 |
| 2 | 7 | 281 | 477 | 7.5 | 285 | 483 | −4 | −6 | 0.5 |
| 3 | 7.5 | 285 | 482 | 8 | 288 | 487 | −3 | −5 | 0.5 |
| 4 | 8 | 288 | 487 | 8 | 288 | 487 | 0 | 0 | 0 |
| 5 | 8.5 | 293 | 492 | 8.5 | 292 | 492 | 1 | 0 | 0 |
| 6 | 8.5 | 292 | 491 | 9 | 297 | 496 | −5 | −5 | 0.5 |
| 7 | 8.5 | 291 | 490 | 8.5 | 293 | 490 | −2 | 0 | 0 |
| 8 | 8 | 289 | 487 | 8.5 | 292 | 491 | −3 | −4 | 0.5 |
| 9 | 8.5 | 292 | 491 | 8.5 | 292 | 490 | 0 | 1 | 0 |

The invention claimed is:

1. A method for manufacturing a strip having a variable thickness along its length, the strip being made of an alloy comprising by weight:
   34.5%≤Ni≤53.5%
   0.15%≤Mn≤1.5%
   0≤Si≤0.35%
   0≤C≤0.07%
   optionally:
   0≤Co≤20%
   0≤Ti≤0.5%
   0.01%≤Cr≤0.5%
   the remainder being iron and impurities necessarily resulting from manufacturing,
   the method comprising the following steps:
   providing an initial strip of constant thickness ($E_0$), obtained by hot rolling;
   homogeneous cold rolling of the initial strip along its length in order to obtain an intermediate strip of constant thickness ($E_c$) along the rolling direction;
   flexible cold rolling of the intermediate strip along its length in order to obtain a strip of variable thickness along the rolling direction, the variable thickness strip having along its length, first areas having a first thickness (e+s) and second areas (10) having a second thickness (e), smaller than the first thickness (e+s),
   continuous final recrystallization annealing of the variable thickness strip in a final annealing oven,
   wherein the plastic deformation ratio generated, after at least one optional intermediate recrystallization annealing, by the steps of homogeneous cold rolling and of flexible cold rolling in the first areas of the variable thickness strip is greater than or equal to 30%
   and
   in which the difference (Δτ) between the plastic deformation ratio ($τ_2$) generated, after the at least one optional intermediate recrystallization annealing, by the steps of homogeneous cold rolling and of flexible cold rolling in the second areas and the plastic deformation ratio generated, after the at least one optional intermediate recrystallization annealing, by the steps of homogeneous cold rolling and of flexible cold rolling in the first areas of the variable thickness strip is smaller than or equal to 13% if the thickness ($E_0$) of the initial strip is strictly greater than 2 mm and smaller than or equal to 10% if the thickness ($E_0$) of the initial strip is smaller than or equal to 2 mm.

2. The manufacturing method according to claim 1, wherein the final recrystallization annealing is carried out at a final annealing temperature between 850° C. and 1200° C. and a dwelling time in the final annealing oven between 20 seconds and 5 minutes.

3. The method according to claim 2, wherein the dwelling time in the final annealing oven between 30 seconds and 3 minutes.

4. The manufacturing method according to claim 1, wherein the homogeneous cold rolling step comprises the at least one optional intermediate recrystallization annealing carried out between two successive homogeneous cold rolling passes and/or at the end of the homogeneous cold rolling before flexible cold rolling of the intermediate strip.

5. The manufacturing method according to claim 4, wherein the intermediate recrystallization annealing is a continuous annealing carried out in an intermediate annealing oven with a temperature of the strip during intermediate annealing between 850° C. and 1200° C. and a dwelling time in the intermediate annealing oven between 30 seconds and 5 minutes.

6. The manufacturing method according to claim 1, wherein the thickness ($E_c$) of the intermediate strip is equal to the second thickness (e) multiplied by a reduction coefficient comprised between 1.05 and 1.5.

7. The manufacturing method according to claim 1, wherein the first thickness (e+s) is equal to the second thickness (e) multiplied by a multiplication coefficient comprised between 1.05 and 1.5.

8. The manufacturing method according to claim 1, wherein before the homogeneous cold rolling step, the initial strip undergoes a microstructure homogenization annealing in a microstructure homogenization annealing oven with a dwelling time in the microstructure homogenization annealing oven between 2 minutes and 25 minutes and a temperature of the microstructure homogenization annealing oven between 850° C. and 1200° C.

9. The manufacturing method according to claim 1, wherein the initial strip is obtained from a semi-finished product such as a slab or an ingot consisting of an alloy elaborated in an electric arc oven or a vacuum induction oven.

10. The manufacturing method according to claim 1, wherein the thickness ($E_0$) of the initial strip is between 1.9 mm and 18 mm.

11. The manufacturing method according to claim 1, further comprising, after the final recrystallization annealing step, leveling the variable thickness strip.

12. The manufacturing method according to claim 1, wherein the alloy comprises by weight:
   34.5%≤Ni≤42.5%
   0.15%≤Mn≤0.5%
   0≤Si≤0.35%
   0.010%≤C≤0.050%
   optionally:
   0≤Co≤20%
   0≤Ti≤0.5%
   0.01%≤Cr≤0.5%
   the remainder being iron and impurities necessarily resulting from manufacturing.

13. The method according to claim 12, wherein 0.1%≤Si≤0.35%.

14. A method for manufacturing at least one blank, comprising:
   carrying out the manufacturing method according to claim 1, so as to obtain a strip having a variable thickness along its length; and
   cutting the variable thickness strip so as to obtain several blanks.

15. The method according to claim 14, wherein the cutting of the variable thickness strip is carried out in the first areas, each blank being formed of a portion of the variable thickness strip located between two successive first areas.

16. A method for manufacturing a cryogenic tube segment, comprising:
   manufacturing at least one blank by carrying out the manufacturing method according to claim 15, the blank comprising longitudinal edges extending along the length of the blank; and then
   rolling up the blank along its width; and
   welding together the longitudinal edges of the rolled up blank in order to form a tube segment.

17. The method according to claim 1, wherein 0.1%≤Si≤0.35%.

18. A variable thickness strip having, along its length, first areas having a first thickness (e+s) and second areas having a second thickness (e) smaller than the first thickness (e+s), the variable thickness strip being made of an alloy comprising by weight:
   34.5%≤Ni≤53.5%
   0.15%≤Mn≤1.5%
   0≤Si≤0.35%
   0≤C≤0.07%
   optionally:
   0≤Co≤20%
   0≤Ti≤0.5%
   0.01%≤Cr≤0.5%
   the remainder being iron and impurities necessarily resulting from manufacturing,
   the first areas having a first average grain size ($G1_{ASTM}$) and the second areas having a second average grain size ($G2_{ASTM}$), the absolute value difference between the first grain size ($G1_{ASTM}$) and the second grain size ($G2_{ASTM}$) being less than or equal to 0.5 numbers according to the ASTM E112-10 standard.

19. The strip according to claim 18, the alloy comprising by weight:
   34.5≤Ni≤42.5%
   0.15%≤Mn≤0.5%
   0.1%≤Si≤0.35%
   0.010%≤C≤0.050%
   optionally:
   0≤Co≤20%
   0≤Ti≤0.5%
   0.01%≤Cr≤0.5%
   the remainder being iron and impurities necessarily resulting from manufacturing.

20. The variable thickness strip according to claim 18, wherein 0.1%≤Si≤0.35%.

21. A blank having, along its length, at least one first reinforced area having a first thickness (e+s) and at least one second area having a second thickness (e) smaller than the first thickness (e+s), the blank being made of an alloy comprising by weight:
   34.5%≤Ni≤53.5%
   0.15%≤Mn≤1.5%
   0≤Si≤0.35%  0≤C≤0.07%
   optionally:
   0≤Co≤20%
   0≤Ti≤0.5%
   0.01%≤Cr≤0.5%
   the remainder being iron and impurities necessarily resulting from manufacturing,
   the at least one first reinforced area having a first average grain size ($G1_{ASTM}$) and the at least one second area having a second average grain size ($G2_{ASTM}$), the absolute value difference between the first grain size ($G1_{ASTM}$) and the second grain size ($G2_{ASTM}$) being less than or equal to 0.5 numbers according to the ASTM E112-10 standard.

22. The blank according to claim 21, the alloy comprising by weight:
   34.5≤Ni≤42.5%
   0.15%≤Mn≤0.5%
   0.1%≤Si≤0.35%
   0.010%≤C≤0.050%
   optionally:
   0≤Co≤20%
   0≤Ti≤0.5%
   0.01%≤Cr≤0.5%
   the remainder being iron and impurities necessarily resulting from manufacturing.

23. An assembly comprising at least one blank according to claim 21 and a part welded to the blank.

24. The assembly according to claim 23, wherein the part is welded to the first reinforced area of the blank.

25. The blank according to claim 21, wherein 0.1%≤Si≤0.35%.

26. A cryogenic tube segment made of an alloy comprising by weight:
   34.5%≤Ni≤53.5%
   0.15%≤Mn≤1.5%
   0≤Si≤0.35%
   0≤C≤0.07%
   optionally:
   0≤Co≤20%
   0≤Ti≤0.5%
   0.01%≤Cr≤0.5% the remainder being iron and impurities necessarily resulting from manufacturing, and which segment comprises a cylindrical central area having a thickness (e) and cylindrical reinforced ends, the cylindrical reinforced ends being formed in one piece with the central area, the cylindrical reinforced ends having a thickness (e+s) greater than the thickness (e) of the central area, the cylindrical reinforced ends having a first average grain size ($G1_{ASTM}$) and the cylindrical central area having a second average grain size ($G2_{ASTM}$), the absolute value difference between the first grain size ($G1_{ASTM}$) and the second grain size ($G2_{ASTM}$) being less than or equal to 0.5 numbers according to the ASTM E112-10 standard.

27. The cryogenic tube segment according to claim 26, wherein the alloy comprises by weight:

$34.5 \leq Ni \leq 42.5\%$
$0.15\% \leq Mn \leq 0.5\%$
$0.1\% \leq Si \leq 0.35\%$
$0.010\% \leq C \leq 0.050\%$
optionally:
$0 \leq Co \leq 20\%$
$0 \leq Ti \leq 0.5\%$
$0.01\% \leq Cr \leq 0.5\%$ the remainder being iron and impurities necessarily resulting from manufacturing.

28. The tube segment according to claim 26, wherein $0.1\% \leq Si \leq 0.35\%$.

\* \* \* \* \*